(No Model.) 2 Sheets—Sheet 2.

H. THIEL.
COTTON STALK CHOPPER.

No. 331,922. Patented Dec. 8, 1885.

Witnesses:
W. S. Duvall
F. L. Fracker

Inventor:
Henry Thiel
by Curtis & Burdett
Attorneys.

UNITED STATES PATENT OFFICE.

HENRY THIEL, OF CLINTON, LOUISIANA.

COTTON-STALK CHOPPER.

SPECIFICATION forming part of Letters Patent No. 331,922, dated December 8, 1885.

Application filed November 21, 1884. Serial No. 148,514. (No model.)

*To all whom it may concern:*

Be it known that I, HENRY THIEL, a citizen of the United States, residing at Clinton, in the parish of East Feliciana and State of Louisiana, have invented certain new and useful Improvements in Cotton-Stalk Choppers, of which the following is a specification, reference being had to the accompanying drawings.

The object of this invention is to provide a machine for removing stalks from the cotton-field in order to prepare the field for subsequent plowing; and the invention consists in certain features hereinafter described, and specifically pointed out in the claims.

The object of this invention is not only to remove all of the stalks in the row, but to chop, cut, or break the portions of stalks which are severed from that portion thereof which remains standing in the ground.

Figure 1:
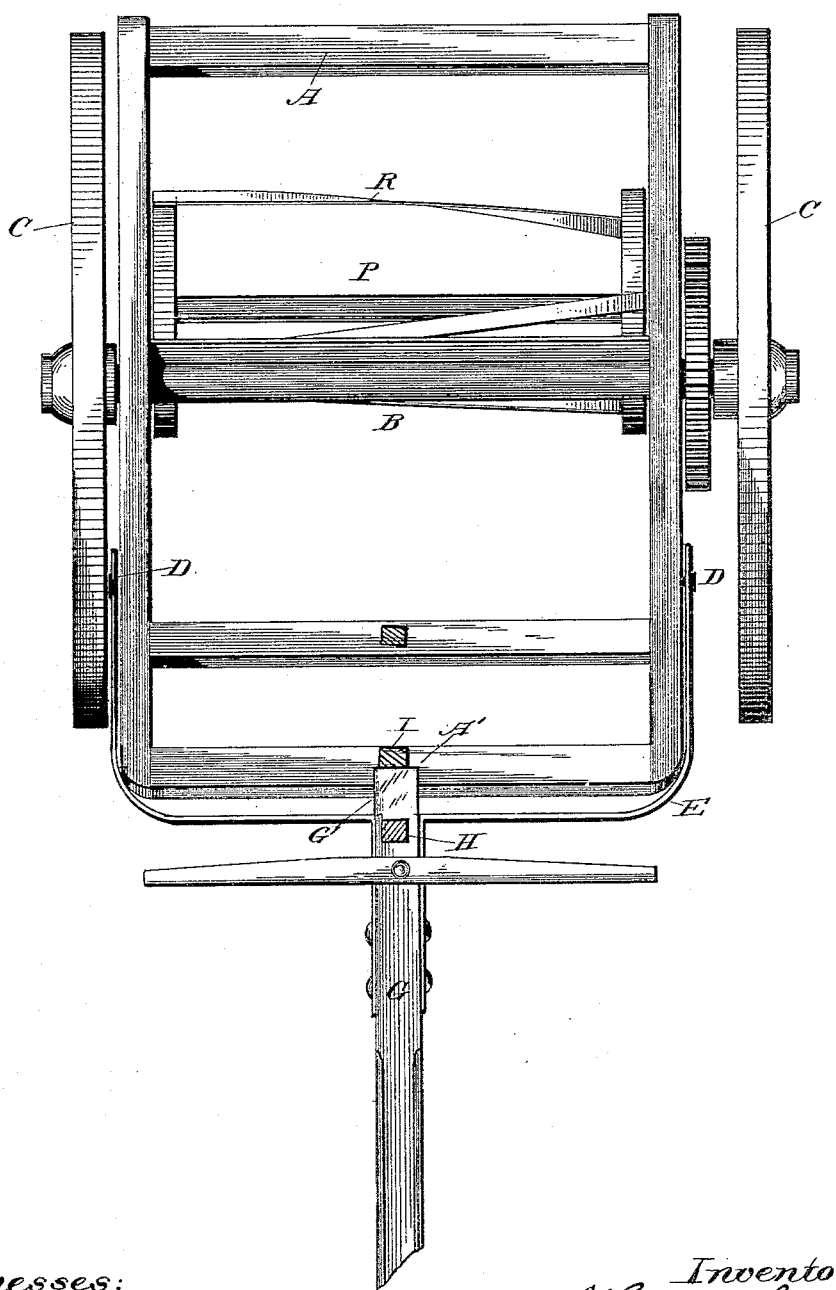
Figure 2:
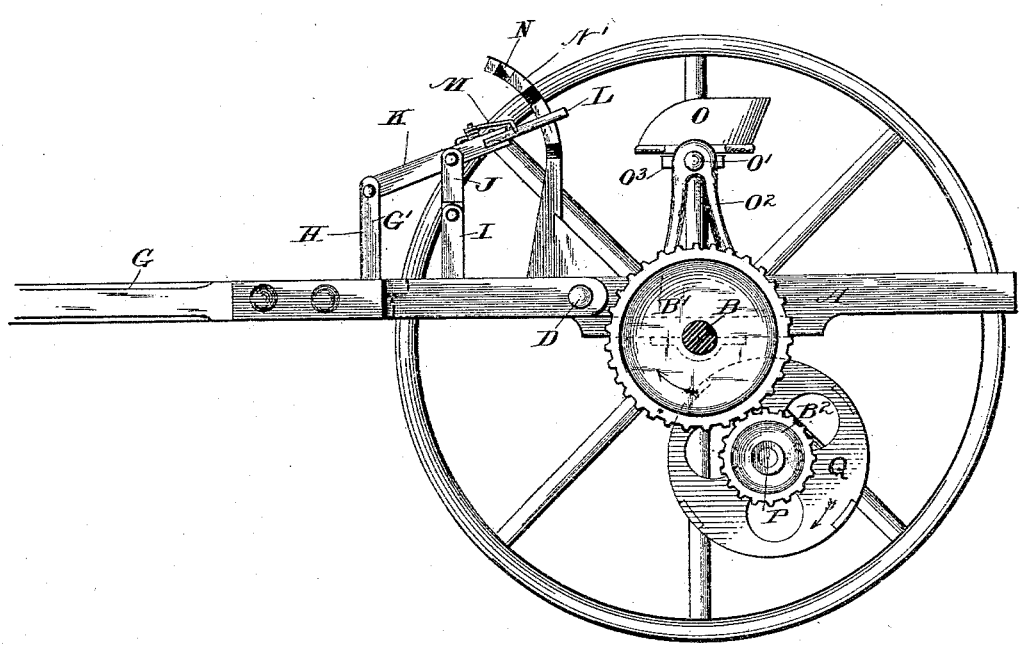

Referring to the drawings, Figure 1 is a plan of a machine constructed in accordance with my invention, with the seat and certain levers removed, the standards of the latter being shown in section. Fig. 2 is a sectional side elevation, and Fig. 3 an enlarged sectional detail hereinafter described.

Like letters indicate like parts in all the figures.

A represents a rectangular frame-work mounted upon an axle, B, to which drive or ground wheels C are secured. To the front of the frame-work is attached pivotally at D a draft-frame, E, to which the draft-pole G is rigidly secured, and is projected at G' beyond the draft-frame E and adapted to rest upon the forward cross-beam of the frame or within a recess, A', formed therein when the draft-frame and the frame-work of the machine are in a horizontal line with each other, as shown by dotted lines, Fig. 2. Near the rear end of the draft-bar is a standard, H, and upon the front bar of the frame-work is a standard, I, having a pivotal extension or link, J, which is connected with an operating-lever, K. The operating-lever K is also pivotally attached to the standard H. At the free end of the lever K is a latch-lever, L, which is normally pressed by a spring, M, into notches N, formed in a standard, N', fixed to the frame of the machine.

By means of the standards and levers described the relative position of the framework with the pole may be adjusted so as to bring the cutting mechanism hereinafter described in greater or less proximity to the ground, to determine the height at which the stalks shall be severed from the roots or from the ground.

O represents the seat for the operator or driver, which is supported on pivots O', having bearings in brackets $O^2$, upon which brackets and a short distance beneath the seat are secured, arranged, or formed lugs or cleats $O^3$, so that the oscillation of the seat O upon its pivots is limited, and so that when the frame is tilted with relation to the pole the seat automatically adjusts itself to substantially a horizontal position.

To the axle B is secured a master-gear, B', which meshes with the pinion $B^2$, mounted on the shaft P of the rotary cutting mechanism employed, the shaft and the parts mounted thereon being supported and operating in standards $P^2$, depending from the framework A.

The cutting mechanism employed consists of two disks, Q, rigidly mounted upon the shaft P and connected by, supporting, and carrying one or more curved cutting-blades, R. In addition to these blades is employed a straight fixed blade, S, which is in this instance arranged above the rotary blades and secured to the standards, but which may be, if desired, arranged in other relative positions to the rotary blades; or, if desired, additional fixed blades may be employed in connection with the blade S, the location and arrangement of which may, if desired, be in front of the rotary blades, as shown by dotted lines X, Fig. 2, any suitable devices being employed to support the same from the frame-work or from the standards $P^2$. Now, it will readily be seen that as the ground-wheels rotate motion will be given to the axle and master-gear, and by the pinion $B^2$ to the rotary cutters, the direction of rotation of the parts being as indicated by the arrow, so that the cutting and chopping operation will be accomplished as indicated by dotted lines Y, Fig. 3—that is to say, one of the rotary blades revolving against the first stalk or stalks cuts it off at the predetermined distance from the ground, the upper portion of the stalk passing over and back of the blade which makes the first cut, and naturally falling across its edge, when it is carried by the rotary blade to and against the stationary blade S, when the second cut is made in the stalk, which, therefore is cut into three sections, and by increasing the number of blades, the fineness or coarseness of the sections into which the stalks shall be cut may be determined at will.

The machine is to be drawn astride a row of stalks to be cut, by either one or two horses, so as to cut and chop all of the stalks in the row.

So far as regards the cutting mechanism employed in my invention I do not wish to be limited to the exact details of construction for adjusting the height of the same above the ground, as other well-known devices may be employed, the operation of the cutting mechanism not being effected thereby; and I deem any combination of rotary cutting devices operating from rear to front and fixed cutting devices arranged to be brought into direct contact with the stalks in a row, so as to cut and afterward and immediately to chop the same, as being of my invention and an important feature thereof.

Figure 3:
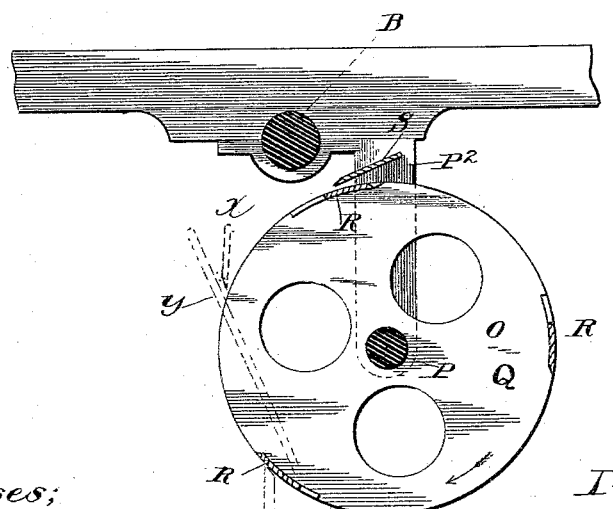

By the expression "from rear to front" hereinbefore used I intend to designate a direction of rotation in the rotary knife or knives which is toward the front in the line of movement of the machine, such direction being indicated by the arrow in Fig. 3.

Having described my invention and its operation, what I claim is—

1. In a cotton-stalk chopper, the combination of rotary cutting mechanism operating from rear to front, with fixed cutting mechanism arranged above the same, and a system of gearing for operating the same from the ground-wheels, substantially as specified.

2. In a cotton-stalk chopper adapted to straddle a row of cotton, the combination of a series of rotary knives, a fixed knife or knives arranged substantially above the same, and devices for revolving the rotary knives from rear to front, substantially as specified.

3. The combination of the frame A, standards $P^2$, the wheel C, axle B, master-gear $B'$, pinion $B^2$, shaft P, rotary cutters R, mounted thereon, and fixed cutter S, mounted on the frame, the combination being and operating substantially as specified.

In testimony whereof I affix my signature in presence of two witnesses.

HENRY THIEL.

Witnesses:
I. D. WALL,
HY. RIST.